United States Patent
Leason et al.

(10) Patent No.: US 8,639,571 B1
(45) Date of Patent: Jan. 28, 2014

(54) REBATE TRANSACTION SYSTEM

(76) Inventors: David Leason, Chappaqua, NY (US);
Scott L. Sullivan, Chappaqua, NY (US)

( * ) Notice: Subject to any disclaimer, the term of this patent is extended or adjusted under 35 U.S.C. 154(b) by 3211 days.

(21) Appl. No.: 09/751,618

(22) Filed: Dec. 28, 2000

Related U.S. Application Data

(60) Provisional application No. 60/174,186, filed on Dec. 29, 1999.

(51) Int. Cl.
*G06Q 30/00* (2012.01)

(52) U.S. Cl.
USPC ............. 705/14.34; 705/14.1; 705/14.23; 705/14.29; 705/14.33; 705/14.37; 705/14.38; 705/14.39

(58) Field of Classification Search
USPC ............ 705/1, 10, 14, 14.1, 14.29, 14.34, 705/14.37, 14.38, 14.39
See application file for complete search history.

(56) References Cited

U.S. PATENT DOCUMENTS

| | | | |
|---|---|---|---|
| 5,513,102 A * | 4/1996 | Auriemma ................ | 705/14 |
| 5,774,870 A * | 6/1998 | Storey ..................... | 705/14 |
| 5,791,991 A | 8/1998 | Small ...................... | 463/41 |
| 5,794,207 A * | 8/1998 | Walker et al. ............ | 705/1 |
| 6,009,411 A * | 12/1999 | Kepecs ................... | 705/14 |
| 6,014,634 A | 1/2000 | Scroggie et al. ......... | 705/14 |
| 6,039,244 A | 3/2000 | Finsterwald ............. | 235/375 |
| 6,185,541 B1 | 2/2001 | Scroggie et al. ......... | 705/14 |
| 6,330,544 B1 * | 12/2001 | Walker et al. ............ | 705/14 |
| 6,405,174 B1 * | 6/2002 | Walker et al. ............ | 705/14 |

(Continued)

FOREIGN PATENT DOCUMENTS

| | | | |
|---|---|---|---|
| JP | 2001-273431 A | 1/2001 | ........... G06F 17/60 |
| WO | WO01/04773 A2 | 1/2001 | ........... G06F 17/00 |
| WO | WO01/43044 A1 | 6/2001 | ........... G06F 17/60 |
| WO | WO01/46848 A2 | 6/2001 | ........... G06F 17/00 |

OTHER PUBLICATIONS

U.S. Appl. No. 60/149,156.*

(Continued)

*Primary Examiner* — Yehdega Retta
(74) *Attorney, Agent, or Firm* — Leason Ellis LLP

(57) ABSTRACT

A system and method for converting a rebate sponsor's offer into an instant credit or price reduction against a follow-on purchase. Rebate requests are obtained at a site on the Internet. The rebate request is tested to confirm that the at least one predetermined criterion has been satisfied. The person making the rebate request is enabled to make the follow-on purchase, with the rebate being converted into the instant credit or price reduction against the total price of the follow-on purchase. The follow-on purchase transaction is completed by charging that person for the purchase. The credit or price reduction can be conditioned on at least one predetermined criterion such as amount being spent on the follow-on purchase, the vendor from which the follow-on purchase is being made, and other criteria. The credit or price reduction can be redeemed in parts across a series of follow-on purchase transactions. In another aspect of the invention, consumers are advised of rebate offers. In this aspect, a server of a credit issuer receives purchase transaction details concerning an item purchase from a vendor, the item purchase is correlated with any rebate offer, and, in the event of a match, the consumer is advised by electronic mail that a rebate is available and can be converted into instant credit or price reduction on a follow-on purchase.

20 Claims, 3 Drawing Sheets

(56) References Cited

U.S. PATENT DOCUMENTS

| | | | |
|---|---|---|---|
| 6,594,640 B1 * | 7/2003 | Postrel | 705/14 |
| 6,694,300 B1 * | 2/2004 | Walker et al. | 705/14 |
| 6,748,365 B1 * | 6/2004 | Quinlan et al. | 705/14 |
| 6,847,935 B1 * | 1/2005 | Solomon et al. | 705/14 |
| 2001/0032134 A1 | 10/2001 | Hardesty | 705/14 |

OTHER PUBLICATIONS

U.S. Appl. No. 60/149,156, filed Aug. 19, 1999, Soloman, abandoned.

* cited by examiner

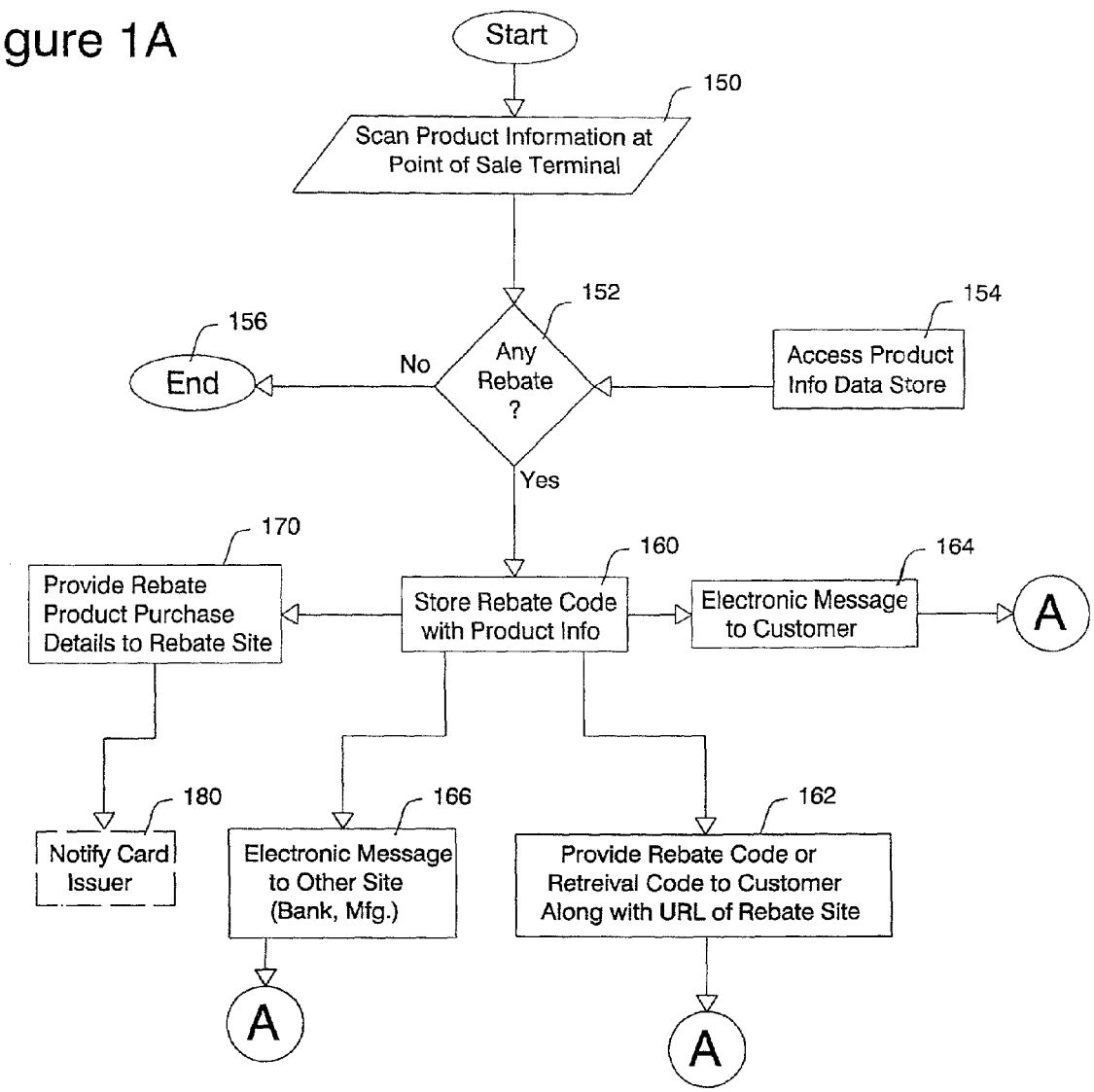

REBATE TRANSACTION SYSTEM

This patent application claims the benefit of priority under 35 U.S.C. Section 119 from U.S. Provisional Patent Application Ser. No. 60/174,186, filed Dec. 29, 1999, entitled "Systems for Reduced Cost Follow-On Transactions Including Vending Machine and Rebate Transaction System," the entirety of which is hereby incorporated by reference.

FIELD OF THE INVENTION

The present invention relates to an electronic system and method for managing rebate transactions.

BACKGROUND OF THE INVENTION

Manufacturer's rebates are part of a common business strategy used to encourage consumers to purchase particular products and groups of products. The rebate returns a predetermined amount of money to the consumer as a refund if the consumer first purchases designated products and meets any other requirements that may have been imposed. The consumer is encouraged to buy such products knowing that, eventually, part of the purchase price will be refunded. The conventional rebate system places the burden on the consumer to complete forms and mail them to the sponsoring company, usually along with a copy of the purchase receipt and a "proof of purchase" identifier from the product packaging. The consumer typically receives the rebate six or more weeks later, and sometimes months later. The sponsoring company can reasonably expect that many consumers, after being enticed by the rebate to buy particular products in the first place will not ultimately follow through with the requirements, or will fail to submit the appropriate forms in time, or simply misplace the receipt and not be able to claim the refund.

With the advent and growth of Internet commerce, rebates have played an important role in enticing consumers to purchase one product instead of another, using the lure of a rebate to offer a net lower price. However, even e-commerce purchase transactions require that forms be completed and mailed in, with the rebate still being received by mail.

What is needed in the art is a rebate transaction system that provides instant rebates to consumers. What is further needed is such a system that provides rebates in the form of credits or refunds that are transferred through a distributed computer network. A further benefit results from such a rebate transaction system that provides incentives for the consumer to make a further sale beyond the product that qualified the consumer for the rebate in the first place. The present invention satisfies these and other needs through systems and methods described below.

SUMMARY OF THE INVENTION

The present invention provides a system and method for converting a rebate sponsor's offer into an instant credit or price reduction against a follow-on purchase. The credit or price reduction can be conditioned on at least one predetermined criterion such as amount being spent on the follow-on purchase, the vendor from which the follow-on purchase is being made, and other criteria. The credit or price reduction can be redeemed in parts across a series of follow-on purchase transactions.

In one aspect, the invention provides a method for converting a rebate request of a person into an instant credit against a follow-on purchase. The method includes the steps of obtaining the rebate request at a site on the Internet. The rebate request is tested to confirm that the at least one predetermined criterion has been satisfied. The person making the rebate request is enabled to make the follow-on purchase, with the rebate being converted into the instant credit or price reduction against the total price of the follow-on purchase. Charging that person for the purchase completes the follow-on purchase transaction. This method can be combined with steps and features of the method described below and with other features and steps of the preferred embodiment, also disclosed below.

In another aspect of the invention, a method is provided for advising a consumer of a rebate offer. This method includes the steps of receiving at a server of a credit issuer purchase transaction details concerning an item purchase from a vendor, correlating the item purchase with any rebate offer, and, in the event of a match, electronically advising the customer by electronic mail that a rebate is available. This method can be combined with steps and features of the method described above and with other features and steps of the preferred embodiment disclosed below.

These and other features and aspects of the invention can be appreciated from the following Description of the Drawings and Detailed Description of the Preferred Embodiment.

DESCRIPTION OF THE DRAWINGS

FIG. 1A is a flow chart of a method for electronically conveying information concerning a rebate product from a transaction processor such as a point of sale terminal or e-commerce back-end server.

DETAILED DESCRIPTION OF THE PREFERRED EMBODIMENTS

By way of overview and introduction, the present invention provides a system for crediting a consumer with a rebate being offered by a rebate-issuer (e.g., a company or a store). The "rebate offer" can be a manufacturer's rebate sponsored by the manufacturer, a service provider's rebate sponsored by a service provider, a store rebate sponsored by a store or chain of stores, or other offer in which the incentive offered to a consumer for purchasing one or more products is in the form of a promise to reimburse the consumer for at least a portion of the cost of the purchase. A consumer satisfies the terms of a "rebate offer" by purchasing a "rebate product," that is, a product for which a rebate is being offered to a consumer if the product is purchased either within a prescribed time period or in conjunction with other products or in accordance with another predetermined criterion or criteria. In a preferred embodiment, the consumer makes a "rebate request" after purchasing the rebate product. The consumer obtains a credit on his or her charge account (e.g., a credit applied to a credit card account) upon making a "follow-on" purchase, that is, a purchase which is not required by the terms of the rebate offer, but which can be the basis for an instant credit in accordance with the invention. The follow-on purchase can be contemporaneous with the rebate product purchase or subsequent to such a purchase.

Figure 1:
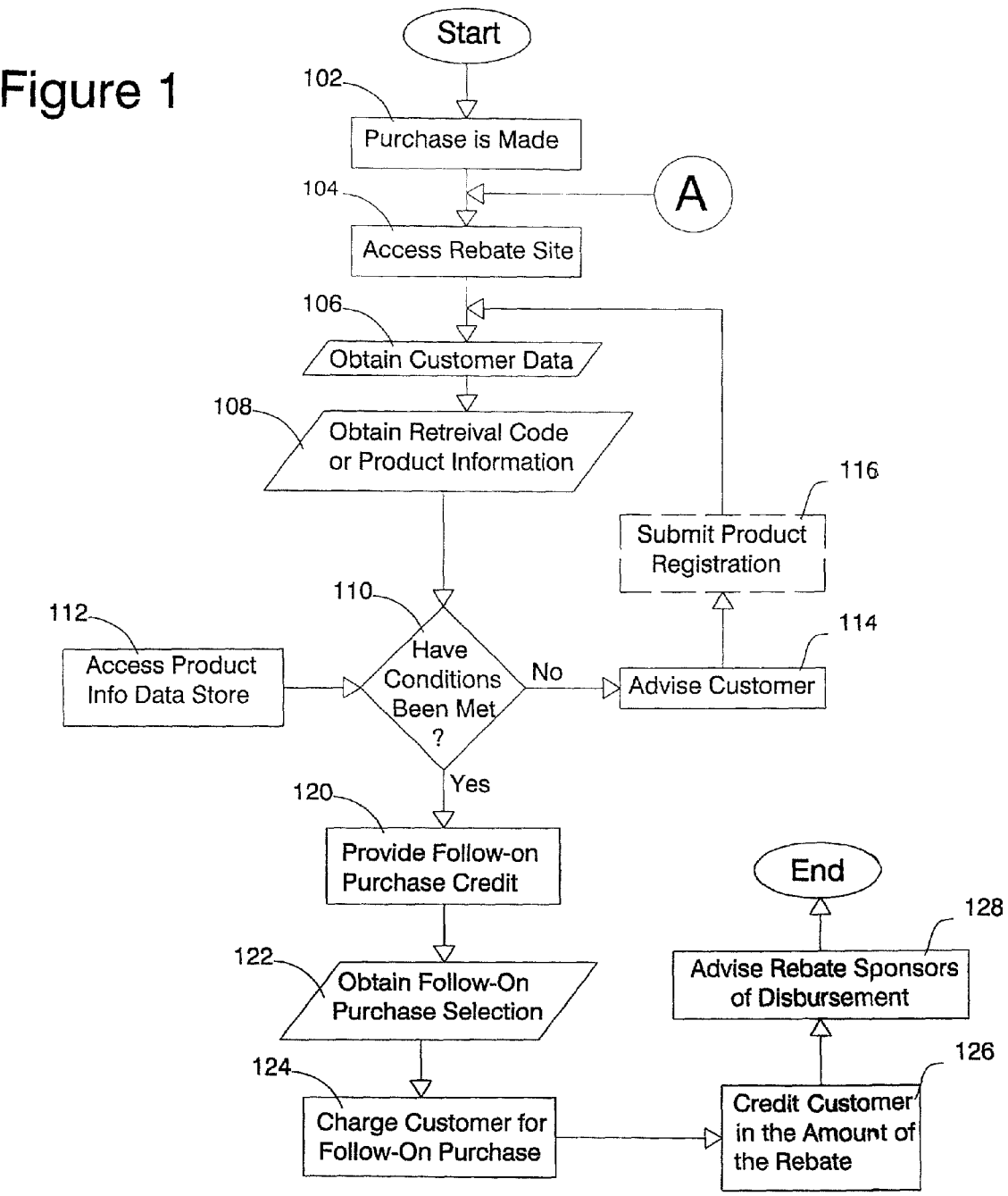
FIG. 1 is a flow chart of a method for processing rebate requests through a distributed computer network.

With reference now to FIG. 1, a consumer purchases a "rebate product" at step 102 in any conventional manner such as by purchasing the rebate product from a conventional retail store in the physical world (a "dirt-world vendor") or from a site accessed through the Internet (a "online vendor"). Unless otherwise specified, dirt-world vendors and online vendors are more generally referred to in this patent specification as "vendors." At step 104, the consumer accesses a site that is configured in accordance with the preferred embodiment of the invention to process rebate requests. The site is preferably a Web site maintained by a server which is operatively connected to the Internet and which is accessed using any standard connection device (e.g., by a modem, T1 line, DSL, cable modem, etc.). The rebate site obtains customer data at step 106 such as the consumer's name, mailing address, e-mail address, and credit card account data so that the rebate site can transfer the rebate to that consumer. At step 108, the rebate site obtains purchase transaction details (PTDs) concerning the purchase of the rebate product from the consumer, including information that ordinarily must be provided to prove to the rebate sponsor that the terms of the rebate have been satisfied. The PTDs can include, for example, the product's brand, model number, serial number, and the date, location and amount paid for the purchase. Optionally, the consumer can enter a retrieval code or rebate code, if known, to identify the particular rebate being redeemed. The information obtained at steps 106 and 108 can be acquired in any conventional manner, for example, by submitting a completed form from a client-side browser to the rebate site.

At step 110, a test is made to determine whether the purchase of the rebate product identified at step 108 satisfies the conditions in the rebate offer concerning that product. The test is preferably performed under software control within the server that runs the rebate site. The test accesses product information from a data store, at step 112, to inform the determination as to whether the conditions have been met. Preferably, the manufacturers, service providers and vendors who are participating in or sponsoring the rebate update the data store with selected PTD information so that the data obtained from the customer at step 108 can be corroborated. In this regard, it is preferred that participating service providers and vendors capture certain data concerning the rebate product at the point of sale such as the brand, model number, and purchase price of the rebate product so that such information can be electronically conveyed to the rebate site. Also, customer data or a unique code provided to the consumer can be used in the test of step 110 to determine whether the person accessing the rebate site is entitled to the rebate. The customer is advised at step 114 that the conditions have not been met and is given the opportunity to resubmit customer data and PTDs.

In the event that the conditions of the rebate offer have not been satisfied, the rebate site optionally can submit the PTDs and customer data to the manufacturer as at step 116, either electronically or by mail, to register the purchase. Products typically come with product registration forms which manufacturers use to gather data on the customers that purchase their products. Product registration can be for demographic study purposes or for informing customers of product recalls, special offers, improvements, warranty validation, and the like.

On the other hand, if the conditions of the rebate offer have been satisfied, at step 120 the rebate site is provided with information concerning the amount of the credit to be awarded the consumer in the event that a follow-on purchase is made. The consumer need not make a follow-on purchase, but can instead elect to have the rebate sent to him or her. However, in the preferred embodiment, the rebate site enables the consumer to select and purchase a follow-on product, which selection is obtained at step 122, and complete that follow-on purchase transaction through an e-commerce back-end processor associated with the rebate site or with an online vendor that is linked to the rebate site. In alternative arrangements, the purchase of the follow-on product can be tracked through the use of a particular credit or debit card.

The customer is charged for the follow-on purchase at step 124. The account to charge for the follow-on purchase can be identified by the customer or can be automatically identified, for example, using information stored on the customer's computer (e.g., in a cookie associated with the rebate site). At step 126, the customer's account is credited in the amount of the rebate. The rebate site can provide the credit, directly from the rebate sponsor, or from another source (e.g., a bank). In an alternative arrangement, the rebate can be deducted from the amount to be charged for the follow-on purchase, the remaining amount being charged to the customer at step 124 to avoid the need for providing a separate credit to the customer at step 126. The rebate site can deduct a portion of the rebate as a service fee, collect a percentage of the follow-on sale, collect a fee for the follow-on sale, or obtain revenue in some other manner in exchange for providing the consumer with an incentive to make the follow-on purchase. At step 128, the rebate sponsor (e.g., manufacturer, service provider, store or chain store headquarters or the like) is advised that the rebate conditions have been satisfied and that a rebate disbursement has been made. Thereafter, accounting can be made as between the rebate site, the rebate sponsor and any bank that was involved in the transaction.

Referring to FIG. 1A, a preferred process is illustrated which can be automatically invoked when a rebate product is presented at a transaction processor such as a point of sale terminal or at an e-commerce back-end transaction processing server. The steps outlined in FIG. 1A need not be completed at the time of the purchase transaction itself; they can be performed in a batch processing mode or on a resources-available basis. At step 150, a product that has been selected for purchase is identified at the transaction processor. The product can be identified in any conventional manner such as by scanning a machine-readable code, as indicated in the Figure, or by inputting a product identifier at the interface to the transaction processor. If the purchase were made at an online vendor, for example, the product can be identified by associating certain product information with the consumer or his or her shopping cart (if a shopping cart model is used by the online vendor as is now conventional).

At step 152, a determination is made as to whether the product is a rebate product, that is, whether any rebate is associated with the product that has been identified at the transaction processor. This determination is preferably performed under software control with the determination being made either at the transaction processor itself (e.g., at an e-commerce transaction processor) or at a server connected to the transaction processor (e.g., a local server to which plural electronic point-of-sale terminals are connected). The determination as to whether there is a rebate associated with the product is readily made if the rebate sponsor is the vendor making the sale; however, the determination can likewise be made if the rebate sponsor is the product manufacturer or service provider by way of an information exchange between the transaction processor and a remote computer server. Regardless of the sponsor, the determination is made with reference to information in a data store 154. Thus, the product identified at step 150 is compared for a match at step 152 against rebate offers provided from the data store 154. If the identified product does not match any rebate offer in the data store, then there is no known rebate associated with the product being purchased and the process ends, as indicated at step 156.

Otherwise, if there is a match between the product being purchased and a rebate offer in the data store 154, then that rebate offer is stored at step 160 with the product information such as the brand, model number, and purchase price of the rebate product. The vendor's ID number can also be stored. Preferably, selected customer data (such as the credit card used and a credit card account identifier) is also stored at step 160 so that the purchase can later be associated with the consumer for rebate claim validation. In addition, because there was a rebate offer associated with a product that was just purchased, a message concerning that purchase transaction is forwarded or provided to one or more destinations, as described below with respect to steps 162-166.

At step 162, the stored information from step 160 is provided to the consumer along with the uniform resource locator (URL) address of the rebate site that has been established to process rebate claims. Preferably, when a rebate product is purchased, as determined at step 152, the consumer is apprized or reminded of the rebate offer to encourage a follow-on purchase with the rebate being provided as an instant credit against the follow-on purchase. The customer can be provided with a printed register receipt that includes the information stored at step 160 to advise the consumer that he or she can redeem the rebate by accessing the rebate site. Access to the rebate site can be through a standard connection to the Internet. The printed receipt also can include a rebate code or retrieval code which is used by the rebate site to determine which rebate is being redeemed by a particular consumer or to identify the particular rebate product purchase transaction. To redeem the rebate, the consumer also may have to provide the serial number of the item that was purchased.

Optionally, the information from step 160 can be conveyed to the consumer by electronic mail, instant messaging or other electronic media, as indicated at step 164. When the rebate product is purchased using a credit or debit card of a card issuer, the card issuer can access a database that stores information about the consumer such as the consumer's name, billing address, transaction history, and an e-mail address. Thus, the card issuer is positioned to provide e-mail messages concerning the availability of an instant credit for making a follow-on purchase, as described in co-pending U.S. patent application Ser. No. 09/250,358, filed, Feb. 12, 1999, entitled "Digital Transaction Reporting with Targeted Advertisements," relevant disclosure from which is set forth below under the heading "Excerpt from U.S. application Ser. No. 09/250,358 Concerning Transaction Reporting By E-Mail With Targeted Advertisements" [which is hereby incorporated by reference as if set forth in its entirety herein]. By contrast, vendors typically do not have access to consumers' e-mail addresses, particularly dirt-world vendors. The e-mail that is sent to the consumer also can provide a digital receipt of the rebate product purchase as well as advertisements, as described in the aforementioned co-pending patent document. If such an e-mail is sent to the consumer, the e-mail preferably includes a hyperlink to the rebate site to simplify the process of getting the consumer to visit the rebate site.

Another destination for the information concerning the purchase by a consumer of a rebate product is the rebate sponsor. The purchase of a rebate product creates a conditional obligation on the rebate sponsor or its bank or creditor to rebate funds to the consumer. The message can be conveyed at step 166 to the rebate sponsor as well as the bank or other creditor to advise them of this conditional obligation.

At step 170, data concerning consumer's purchase of the rebate product and the purchase transaction details stored at step 160 are provided to the server of the rebate site over a standard network connection between the transaction processor (e.g., point of sale terminal or e-commerce server) or a server connected to the transaction processor and the server that maintains the rebate site. The data transfer to the server of the rebate site can be done at the time of the purchase or at a time shortly thereafter, such as in connection with a batch transfer from the vendor to the rebate site, and can be done periodically or in accordance with a prescribed condition (at store closing, every hour, every 10 rebate purchases, or a combination of these conditions). This data can be stored in the data store, which is accessed at step 112. Optionally, notice of this event is sent at step 180 to the card issuer of any credit or debit card that was used by the consumer to make the purchase, with at least a portion of the information from step 170 being available to the card issuer for further processing.

Figure 2:
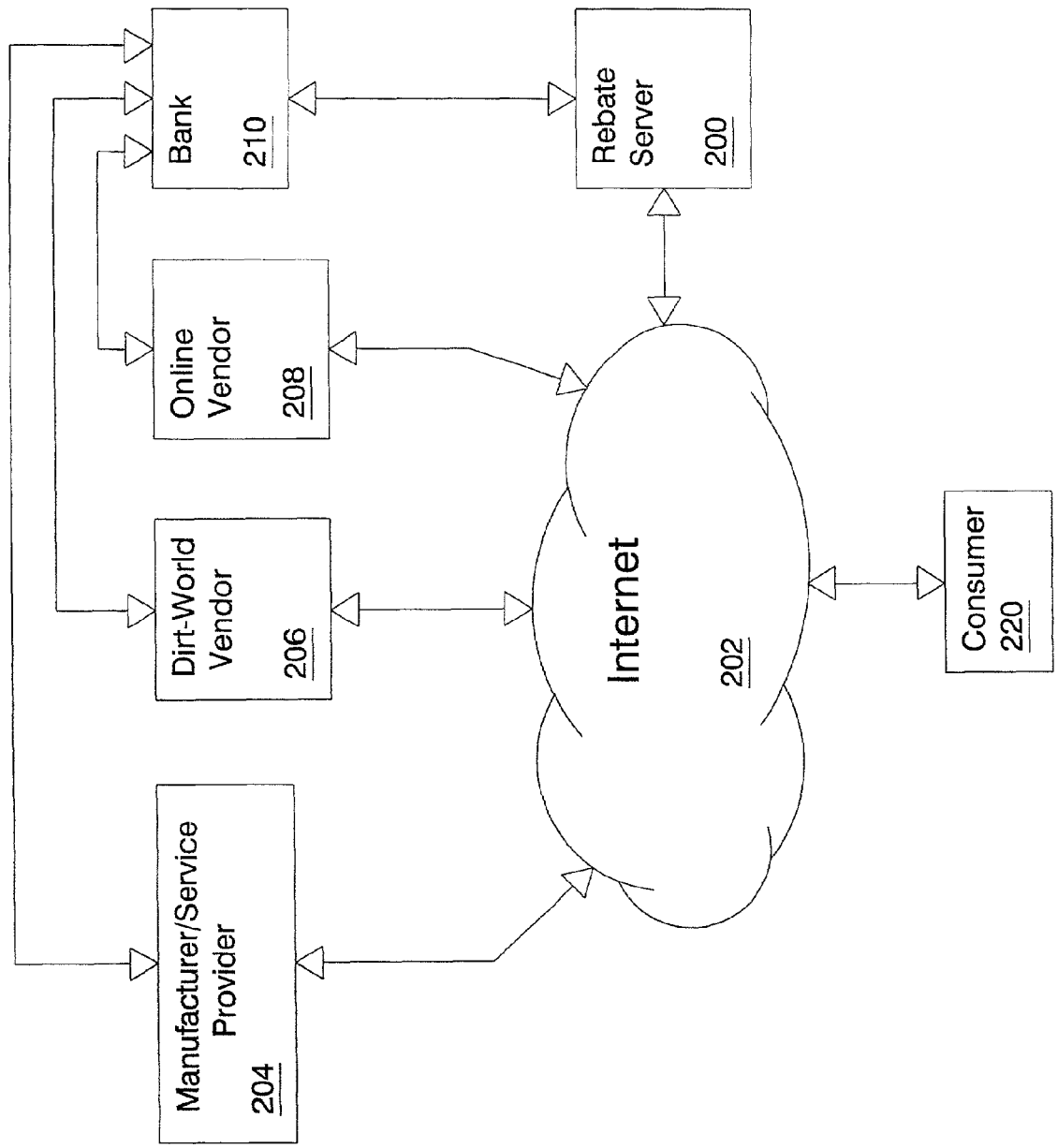
FIG. 2 is block diagram of a rebate transaction system constructed in accordance with the present invention.

With reference now to FIG. 2, a network arrangement is illustrated which can be used to implement the preferred embodiment. It should be understood that the hardware components described herein form no part of the present invention.

A rebate server 200 is connected to a distributed computer network through the Internet 202 and is configured to implement the system and method of the preferred embodiment. Manufacturers/service providers 204, dirt-world vendors 206 and online vendors 208 that are interested in sponsoring rebates to entice their consumers to make purchases can also can be connected to the Internet 202 through standard communication lines. Such rebate sponsors preferably register the products that are subject to rebates with the rebate server 200, including details such as the brands, model numbers, amount, total number of rebates to grant for such products (e.g., rebates will be offered only for the first 1000 products sold), any window of time for registering rebate requests, and other predetermined conditions or criteria. The rebate site or the sponsor can assign a rebate code to each rebate being maintained at the rebate server. The rebate code can be provided to the consumer and used to redeem a rebate. The rebate server 200 preferably communicates directly with a bank 210, which underwrites or manages an account from which disbursements for any redemption requests are made.

In use, a consumer 220 can benefit from the present invention regardless of whether a rebate product is purchased at the online vendor 208 or the dirt-world vendor 206. In the event that the consumer 220 purchases a product at the online vendor 208 for which a rebate applies, as determined by the process of FIG. 1A, the data concerning consumer's purchase of the rebate product and other purchase transaction details are provided to the rebate server 200 (e.g., to be accessible at step 170) and the consumer is apprized that the rebate can be instantly redeemed at the rebate site, for example, after checkout, by an instant message, by e-mail or by a printed notice included with the shipped product. It should be understood that the functionality of the rebate site could be implemented at the Web site of the online vendor 208 rather than at a separate (virtual) address. Regardless of the form of notifying the consumer of the rebate site, the purpose is to encourage the consumer to make a follow-on purchase by spending the rebate on additional products or services at vendors that have been designated, selected, or made available by the rebate site.

The consumer can be provided with a choice as to how the rebate is to be provided. Thus, the consumer can receive the rebate in the form of a check, if desired. However, the system and method of the preferred embodiment encourage follow-on purchases by making the rebate available as an immediate credit (on a consumer-designated debit or credit account) at the time of making a follow-on purchase or as a price reduction for making the follow-on purchase.

When the rebate product is purchased at the dirt-world vendor 206, the rebate information is provided to the rebate site at step 170, as previously described, and a notice of this event can be sent to the card issuer for further processing, as indicated at step 180. Thus, if the consumer purchases a rebate product from a dirt-world store using a credit card, the rebate code can be automatically transmitted to the card issuer with the card issuer then sending an electronic message to the consumer. The card issuer is better suited for this type of communication because traditionally, retailers have not had access to their customers' e-mail addresses—at least not in a system which permits correlation of customer purchases with an entitlement to a rebate.

The bank or card issuer can centrally distribute rebates on behalf of the rebate sponsor. In particular, the bank or card issuer receives rebate codes from the dirt-world vendor 206 and online vendors 208 in connection with a particular transaction from that vendor, which transaction conventionally has an identifying transaction number associated with it. The bank or card issuer can apply the rebate as a credit on the account of the cardholder and charge the rebate sponsor for the service.

The invention can apply to cash transactions provided that the consumer uses a rebate code or other transaction identifier to establish that the purchase being made is a follow-on purchase to a rebate product purchase and is not merely a purchase that does not qualify as a follow-on purchase.

The rebate can be restricted to be instantly redeemable only if prescribed conditions are met such as if the consumer makes a series of prescribed purchases at one or more prescribed vendors, makes purchases of specified products or services, uses specified credit cards or card issuer's cards, shops at designated or participating vendors, makes purchases from the same or a specified vendor, makes purchases in a predetermined amount or greater, and/or makes follow-on purchases within a prescribed time period. It may be that follow-on purchases are not made in accordance with the prescribed conditions (e.g., a requirement that the customer make a series of purchases) in which case the consumer forfeits that portion of the rebate, which can then be retained by the card issuer, vendor, and/or manufacturer.

Example 1

A consumer purchases a television at Scott's Electronics Store for $300.00 using a VISA® brand credit card. The television includes a rebate offer by its manufacturer in the amount of $50.00. The consumer conventionally can redeem the rebate if proof-of-purchase information and product registration information is mailed to the manufacturer. However, in accordance with the preferred embodiment described above, the consumer can receive an instant rebate in an amount of up to $50.00 in the form of a credit on the consumer's VISA® statement by making one or more follow-on purchases either at the time that the television is purchased or within a period of time thereafter.

The purchase from Scott's Electronics Store causes the rebate code, product information and preferably customer-identifying data to be forwarded to the rebate server, which can be the same server as used by the card issuer (here, VISA®) to process the transaction. Any follow-on purchases made by that customer using the same card can be correlated to the conditional award of the instant rebate and at least a portion of the rebate can be provided to the consumer at the time of each follow-on purchase. VISA® can automatically keep track of the purchases made by the consumer, whether rebate conditions have been met, and automatically apply any credit due (less any service charge), as reflected in the monthly statement to the consumer.

The rebate sponsor is apprized of the consumer's agreement to accept the instant rebate to prevent the sponsor from issuing one rebate electronically and a second rebate to the same consumer by mail.

It should be appreciated that, for some purchase transactions including those that use the online shopping cart model, the requirements for redeeming a rebate can be satisfied during a single purchase transaction session in which the consumer is purchasing the rebate product and at least one follow-on product. In that situation, the server configured to implement the functionality of the rebate server can apply the rebate as a credit to the account that the consumer is using to pay for his or her purchases, or can reduce the price of the rebate product or the follow-on product generally in the amount of the rebate; it being understood that a transaction fee for processing the instant rebate can influence the amount of credit or price reduction that the consumer recognizes in the purchase transaction. The credit/price reduction can be offset by money received from the manufacturer/service provider 204, the vendor 208, or the bank 210.

Figure 3:
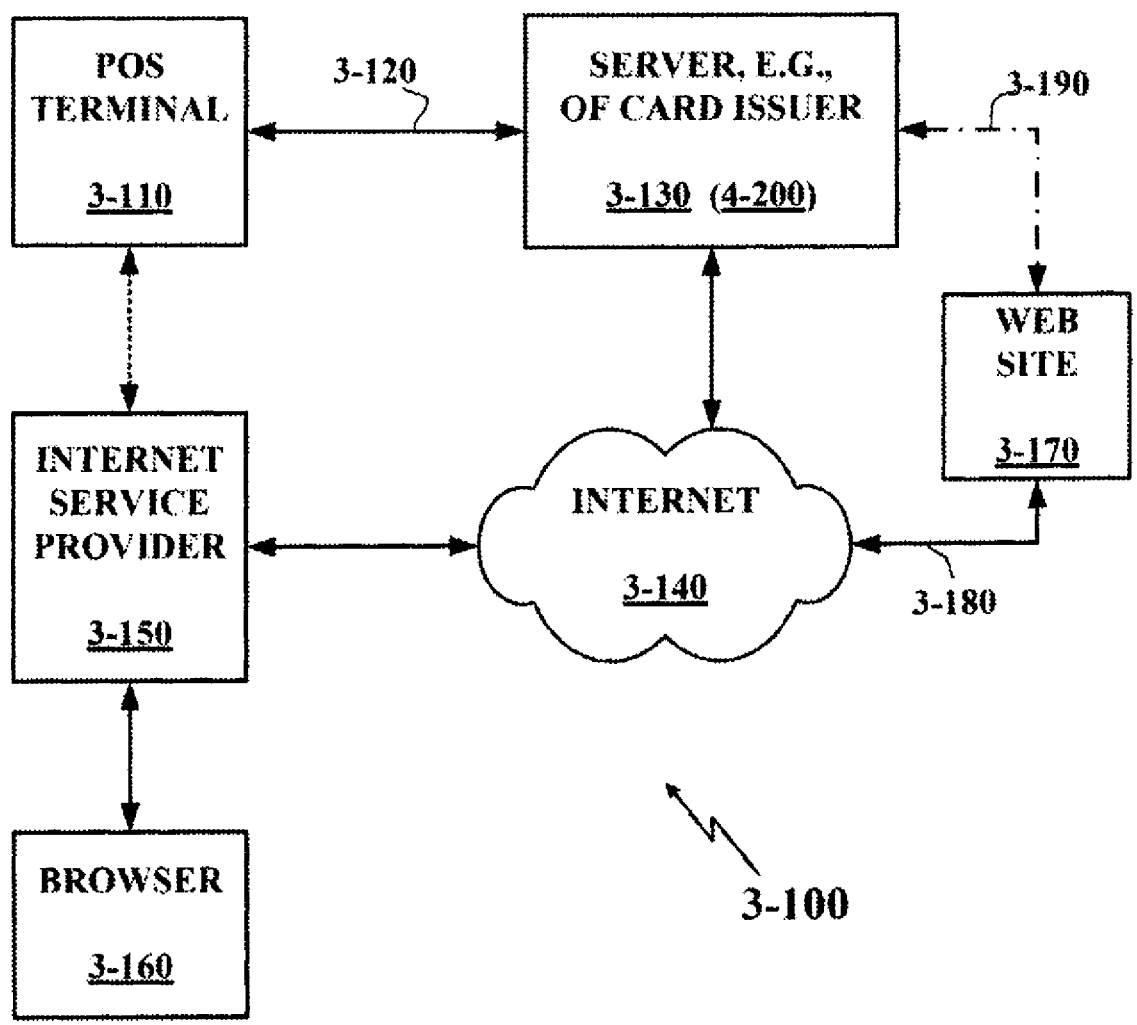
Figure 4:
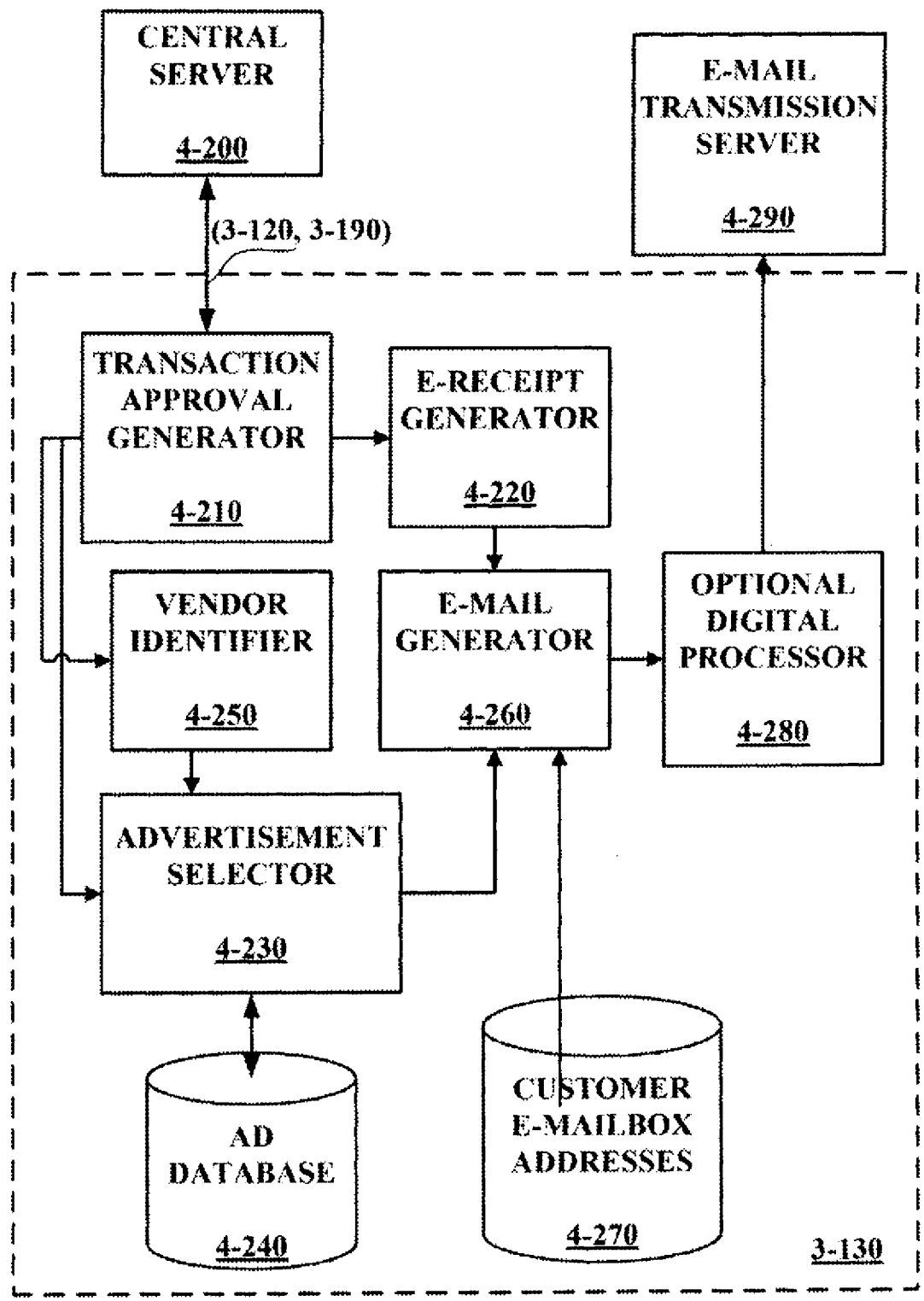
Figure 5:
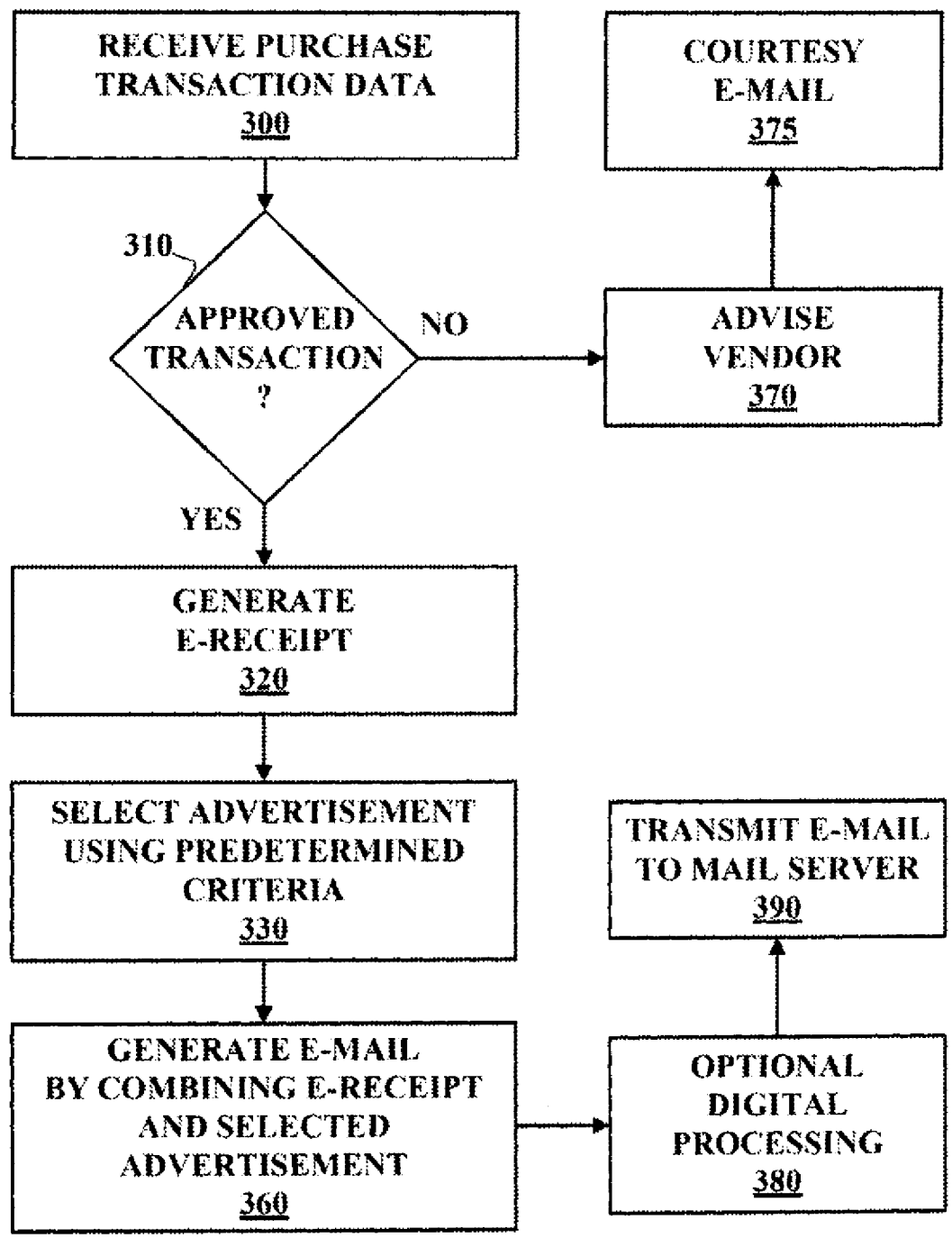

Excerpt from U.S. application Ser. No. 09/250,358 Concerning Transaction Reporting By E-Mail With Targeted Advertisements FIG. 3 illustrates a block diagram of a hardware arrangement that may be used in the present invention;

FIG. 4 illustrates a detailed functional block diagram of the server of FIG. 3, arranged to implement the present invention and showing an electronic receipt generator;

FIG. 5 illustrates an exemplary flow diagram of a method in accordance with the invention, as may be implemented by the arrangement of FIG. 3;

In a retail store environment, the purchase is made at a point of sale (POS) terminal 3-110 or cash register, as shown in FIG. 3. A typical POS terminal includes a keyboard, display, cash drawer, and a receipt printer. In addition, the POS terminal 3-110 includes a card reader or optical scanner to read any credit or debit card that may be presented by a customer and also includes a communication line 3-120 to connect the POS terminal to a server 3-130. The server 3-130 provides purchase transaction approvals whenever the transaction amount is within prescribed limits for the card being presented. Optionally, the POS terminal 3-110 can communicate purchase transaction details over the Internet 3-140 through a connection thereto, such as through an Internet service provider (ISP) 3-150, as shown by the dashed double-headed arrow.

When a purchase is made through an online connection, the customer initially accesses the Internet 3-140 in a conventional manner through a direct connection or through the ISP 3-150 such as America Online®. Using a multimedia Internet browser 3-160 such as Internet Explorer®, a product of Microsoft®, Redmond, Wash. or Netscape Navigator®, a product of Netscape Communications® Corporation, Mountain View, Calif., the customer browses sites on the Internet, such as web site 3-170. The web site 3-170 is connected to the Internet through a direct or intermittent (e.g., by a telephone connection using a modem) connection 3-180. The customer selects items for purchase from the vendor (web site 3-170) and designates an account to charge for any selected items (e.g., a credit, debit or e-charge account of eCharge Corporation, Seattle, Wash.). The charge account information is typically encrypted with a public key prior to being sent over the Internet or transmitted through a separate connection. See U.S. Pat. No. 5,745,556. The vendor submits the transaction to the server 3-130 of the card issuer, either through an optional private communication line 3-190 or over the Internet 3-140, and receives transaction approvals or disapprovals from that server.

Whether the purchase transaction is made in a retail store or online, the purchase transaction approvals or disapprovals are provided by the server 3-130. In the preferred embodiment, the invention is embodied as a software program running on the server 3-130. The server 3-130 comprises a general purpose digital computer configured as a host or server.

With reference now to FIG. 4, the arrangement of the server 3-130 is described in detail. Typically, an underwriting bank will have its own local server 3-130 for processing credit card transactions. The local server 3-130 is accessed by a central server 4-200. Thus, Chemical Bank® and Citibank®, for example, may both underwrite Visa® credit cards and each may have its own server 3-130 for approving a purchase transactions on cards they have issued. The central server 4-200 determines which local server 3-130 to forward the purchase transaction details, retrieves the purchase approvals from that local server, and returns the approvals or disapprovals to the initiating vendor. This may proceed, for example, over the communication lines 3-120 or 3-190 or through the Internet connection.

The server 3-130 includes a transaction approval generator 4-210 which provides approval codes to the vendor. If the vendor is a retail store, the approval codes are provided to the POS terminal 3-110. If the vendor is an online vendor, the approval codes are provided to the web site 3-170. For each approved purchase transaction, the purchase transaction details are provided to an electronic-receipt ("e-receipt") generator 4-220. The e-receipt generator 4-220 arranges the purchase transaction details into a format which can be readily included into the text field of a standard e-mail as e-receipt data. The e-receipt data may include: vendor name, UPC bar code or other machine readable code for one or more of the products/services that were purchased, vendor address, vendor tax ID, date, time, receipt number, number in party, bill amount, tax amount, total amount paid, how paid, a digital signature of the vendor and an optional digital signature of the customer. The e-receipt data may further include an itemization of each item purchased or each service rendered in a variable length field, if those transaction details are provided to the e-receipt generator. If the purchase transaction were a stock, the e-receipt would include the number of shares, the company, whether it is a buy or sell transaction, any limit or strike price, other terms (good-until-canceled, fill-or-kill, all-or-none), and the like, all arranged for inclusion into the text field of an e-mail. Similarly, option trades can be reported in an e-receipt with the relevant transaction details being arranged into a format for inclusion in the text field of an email.

In accordance with one aspect of the present invention, for each approved purchase transaction, an advertisement is selected using an advertisement selector 4-230. The selected ad is combined with the e-receipt data and transmitted as a single e-mail to an e-mailbox of the customer. Preferably, the ad that is selected is closely related to the actual purchase that was made and is selected based upon the specific purchase transaction identified in the e-receipt. The advertisement selector 4-230 operates to select one or more advertisements from a database 4-240 or another data store located elsewhere. The advertisements may include text, pictures, video, sound, applets or other information to attract and solicit the interest of or interact with the customer. For more information on embedding a URL into an e-mail, see U.S. Pat. No. 5,790,793, the disclosure of which is incorporated by reference as if set forth in its entirety herein. What is important to the invention is that the selected advertisement be provided in response to a specific purchase transaction of the customer.

The vendor may be identified by a vendor identifier 4-250 which obtains the vendor name from the purchase transaction details provided on communication lines 3-120, 3-190 or through the Internet connection. The advertisement selection may be based on the vendor identifier to entice the customer to visit that vendor's store or web site or to promote a different vendor, for example, a vendor of related goods or services.

The advertisement is selected based upon predetermined criteria. As used herein "criteria" is meant to include the singular (that is, one criterion). The criteria for selecting an advertisement can vary but uses the information in the purchase transaction details in the selection process. The bases for making a selection include, but are not limited to: (a) selecting the advertisement of the vendor at which the purchase was made; (b) selecting the advertisement of a vendor of related products or services (e.g, selecting the ad of a music store when books were purchased); (c) selecting the advertisement of a manufacturer of one of the products that was purchased; (d) selecting the advertisement of a service provider of a service that was purchased; (e) selecting the advertisement for a product or service related to a product or service which does not compete with the items that were purchased (e.g., selecting an ad for car insurance when the specific purchase was for gasoline), (f) selecting the advertisement of a product or service that competes with one of the purchases identified in the e-receipt (e.g., selecting a specific brand of cola when another brand was purchased); (g) selecting the advertisement based on a random selection of an ad contained within the database 4-240, (h) selecting an advertisement based on geographic proximity of the store where the purchase was made to other stores (e.g., "Thank you for shopping at Athlete's Shoes. Next time, why not visit Music Express, located right next door."), (i) restricting selections of ads from the database 4-240 to paid-up advertisers. Of particular value to advertisers is the data maintained by the card issuer on each account holder. Such information includes the customer's credit history, credit limit, spending pattern, address, and other information which is generally not released to any vendors. Any of this information can be a basis for selecting an advertisement at step 330.

As shown in FIG. 4, the selected advertisement is combined with the e-receipt data by an e-mail generator 4-260. The e-mail generator 4-260 arranges the e-receipt data and the selected advertisement into a format which can be readily transported over the Internet 3-140. A standard e-mail format includes a header, a subject field, and text or body. The header includes the network address of the customer where the message is to be delivered. The customer's network address is preferably maintained at the server 3-130 in a database 4-270, but may be included on the credit/debit card. Because the customer's identity is known from the card when presented at the POS terminal 3-110 (or when an account is designated during an online transaction at the web site 3-170), his or her e-mail box address can be retrieved in a conventional manner from the database 4-270. The subject field identifies the nature of the e-mail, such as "receipt" or "Feb. 12, 1999 Visa® purchase." The text field includes the e-receipt data described above as well as the selected advertisement. The text field of the e-mail may be in HTML format.

The e-mail message that is constructed by the e-mail generator 4-260 optionally may undergo further digital processing such as encryption and application of digital signature, as described in the aforementioned U.S. Pat. No. 5,739,512, using an optional digital processor 4-280. The e-mail from the e-mail generator 260 or digital processor 4-280 is transmitted by an e-mail transmission server 4-290 over the Internet 3-140 to the e-mailbox address of the identified customer.

Through a standard protocol (e.g., TCP/IP, SLIP, PPP), the e-mail is sent to the e-mailbox of the customer where the e-receipt data can be opened, read, and perhaps processed by the customer's accounting software package where the e-receipt data can be included in expense reports, tax returns, other types of financial software packages, and the like.

With reference now to FIG. 5, a method in accordance with the present invention is described. At step 300, a server receives the purchase transaction data from a vendor over the communication lines 3-120, 3-190 or the Internet connection. The proposed transaction is either disapproved or approved at step 310 by the transaction approval generator 4-210. If approved, the e-receipt data is generated at step 320 by the e-receipt generator 4-220 using the purchase transaction details. Also, an advertisement is selected at step 330 using the advertisement selector 4-230, based upon predetermined criteria. Thereafter, the e-mail is generated at step 360 using the e-mail generator 4-260 by combining the e-receipt data with the selected advertisement into a format suitable for transfer over the Internet to the purchaser's e-mailbox. If the purchase transaction were disapproved, the vendor would be so advised at step 370. The e-mail may be digitally processed at step 380 by the optional digital processor 4-280 prior to being transmitted by the e-mail server at step 390. A courtesy e-mail can be provided to the customer, as shown at step 375, in the event that the purchase transaction were refused, which e-mail may include contact information (telephone numbers, facsimile number, e-mail address) which may be used to investigate or correct any problems with the selected account.

It should be understood that certain functions of the local server 3-130 can be implemented by the central server 4-200 within the scope of the present invention. For example, the vendor identifier 4-250, advertisement selector 4-230 and database 4-240 of the present invention can be executed at the central server 4-200, with the selected advertisement provided along with the purchase transaction details to the e-receipt generator 4-220 and e-mail generator 4-260.

While the present invention has been described with respect to a preferred embodiment thereof, it is not so limited. The detailed description is presented to enable one of skill in the art to practice the invention and to disclose the best mode known to the inventors as of the date of filing this patent application. The invention more broadly encompasses systems and methods defined by the recitations in the claims appended hereto and the equivalents of such recitations, and is not restricted to the description of any particular embodiment provided hereinabove.

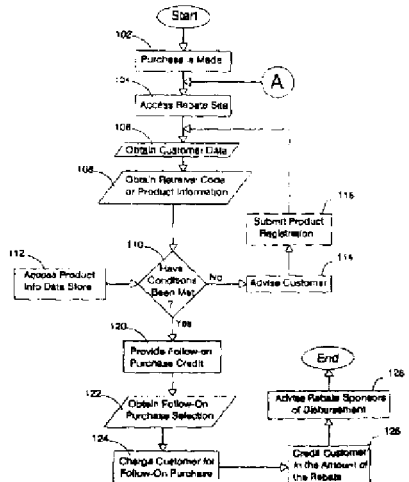

What is claimed is:

1. A computer-implemented method for converting a request for a rebate into an instant credit against a follow-on purchase at a vendor, the rebate being offered by a rebate sponsor and being associated with purchase transaction details of a first item purchase by a customer, comprising the steps of:
    (a) receiving, in electronic form, the request at a server connected to the Internet;
    (b) confirming under software control at the server that any applicable terms for receiving the rebate that are associated with the first item purchase have been satisfied by the customer, wherein the confirming step includes the software corroborating the purchase transaction details of the request with contents of a data store;
    (c) obtaining the follow-on purchase information of the customer either from the server or by tracking the follow-on purchase information through use of a particular credit card, the follow-on purchase information including a follow-on purchase price;
    (d) selectively allowing at least a portion of a value of the rebate as the instant credit against the purchase price of the follow-on purchase if the applicable terms, as confirmed at the server, have been satisfied;
    (e) completing the follow-on purchase at a net charge to the customer which is equal to the purchase price minus the instant credit; and
    (f) accounting to the vendor by offsetting the instant credit to the customer with money received by the vendor from an account of the rebate sponsor.

2. The method as in claim 1, wherein the follow-on purchase information is obtained at a time after the request is received at the server, and wherein the completing step is performed through either an e-commerce back-end processor or through a link from the vendor to the server.

3. The method as in claim 1, wherein the follow-on purchase is made contemporaneously with the first item purchase.

4. The method as in claim 1, wherein the follow-on purchase is made at a second site different than that of the first item purchase.

5. The method as in claim 1, including the additional step of applying a service fee to the follow-on purchase.

6. The method as in claim 5, wherein the service fee is deducted from the rebate.

7. The method as in claim 1, including the additional step of enabling the customer to make the follow-on purchase solely from pre-selected items.

8. The method as in claim 1, wherein the allowing step occurs on the condition that the follow-on purchase exceeds a minimum purchase amount.

9. The method as in claim 1, wherein the rebate is offered by a rebate sponsor and wherein the step of accounting to the vendor comprises the rebate sponsor accounting to the vendor.

10. The method as in claim 1, wherein the allowing step is further conditioned upon the follow-on purchase being made from a prescribed vendor.

11. The method in as claim 1, wherein there are plural portions of the value of the rebate allowed as plural credits across a series of follow-on purchases.

12. The method as in claim 1, wherein:
    the receiving step comprises obtaining purchase transaction details (PTDs) from the customer concerning the first item purchase and receiving customer data or a unique code,
    the PTDs are also conveyed by participants other than the customer to a data store associated with the server so that the PTDs information received from the customer can be corroborated, and
    the received one of the customer data and the unique code is used in the confirming step.

13. A computer-implemented method for applying at least a portion of a value of a third-party rebate offer associated with a first item that has been purchased by a customer into an instant credit against a purchase of a second item having a purchase price, comprising the steps of:
    (a) receiving the third-party rebate offer at a transaction processor of a vendor;
    (b) electronically communicating the third-party rebate offer to a server;
    (c) confirming under software control at the server that any terms associated with the first item have been satisfied;

(d) selectively allowing at least a portion of the value of the rebate as the instant credit against the purchase price of the second item if the server confirms that said any terms have been satisfied;

(e) completing the purchase of the second item by the customer from the vendor at a net charge to the customer which is equal to the purchase price minus the instant credit; and (f) accounting to the vendor for the instant credit to the customer.

14. The method as in claim 13, wherein the rebate is offered by a rebate sponsor and wherein the step of accounting to the vendor comprises the rebate sponsor accounting to the vendor.

15. The method of claim 13, wherein the transaction processor comprises a register or an e-commerce back-end server, and wherein the completing step is performed through either the e-commerce back-end processor or through a link from the vendor to the server.

16. The method of claim 13, wherein the second item purchase is made within a prescribed time period after the first item purchase in order to satisfy the terms of the third-party rebate offer.

17. The method of claim 13, wherein the first item purchase is purchased in conjunction with other products in order to satisfy the terms of the third-party rebate offer.

18. In a follow-on purchase transaction by a customer in which the customer is purchasing or has purchased a first item having an associated rebate offer being offered by a rebate sponsor, a computer-implemented method for applying at least a portion of a value of the rebate offer as an instant credit toward a purchase price of a second item, comprising the steps of:

(a) confirming under software control at a server whether any terms associated with the rebate offer associated with the first item have been satisfied;

(b) selectively allowing at least the portion of the value of the rebate offer as the instant credit to the customer toward the purchase price of the second item if said any terms of the associated rebate offer have been confirmed by the server as having been satisfied;

(c) completing the purchase of the second item from a vendor through an e-commerce back-end processor or through a link from the vendor to the server at a net charge to the customer which is equal to the purchase price minus the instant credit; and (d) the rebate sponsor accounting to the vendor for the instant credit to the customer.

19. The method of claim 18, wherein the completing step comprises using a credit card of the customer to complete the purchase of the second item, the method including the additional step of forwarding a message concerning the second item purchase to one or more destinations.

20. The method of claim 19, wherein one of the one or more destinations includes an email address which is associated with the credit card of the customer.

* * * * *

UNITED STATES PATENT AND TRADEMARK OFFICE
CERTIFICATE OF CORRECTION

PATENT NO.       : 8,639,571 B1                              Page 1 of 5
APPLICATION NO.  : 09/751618
DATED            : January 28, 2014
INVENTOR(S)      : David Leason and Scott L. Sullivan It is certified that error appears in the above-identified patent and that said Letters Patent is hereby corrected as shown below:

Title Page

Delete Title Page, and replace with new Title Page. (Attached)

In the Drawings

Add three sheets, consisting of figures 3-5, renumber drawing sheets as 4-6. (Attached)

Signed and Sealed this
Fifteenth Day of April, 2014

Michelle K. Lee
*Deputy Director of the United States Patent and Trademark Office*

(12) United States Patent
Leason et al.

(10) Patent No.: US 8,639,571 B1
(45) Date of Patent: Jan. 28, 2014

(54) REBATE TRANSACTION SYSTEM

(76) Inventors: David Leason, Chappaqua, NY (US); Scott L. Sullivan, Chappaqua, NY (US)

(*) Notice: Subject to any disclaimer, the term of this patent is extended or adjusted under 35 U.S.C. 154(b) by 3211 days.

(21) Appl. No.: 09/751,618

(22) Filed: Dec. 28, 2000

Related U.S. Application Data

(60) Provisional application No. 60/174,186, filed on Dec. 29, 1999.

(51) Int. Cl.
*G06Q 30/00* (2012.01)

(52) U.S. Cl.
USPC ............ 705/14.34; 705/14.1; 705/14.23; 705/14.29; 705/14.33; 705/14.37; 705/14.38; 705/14.39

(58) Field of Classification Search
USPC ............ 705/1, 10, 14, 14.1, 14.29, 14.34, 705/14.37, 14.38, 14.39
See application file for complete search history.

(56) References Cited

U.S. PATENT DOCUMENTS

| | | | | |
|---|---|---|---|---|
| 5,513,102 | A | * | 4/1996 | Auriemma ............ 705/14 |
| 5,774,870 | A | * | 6/1998 | Storey ............ 705/14 |
| 5,791,991 | A | | 8/1998 | Small ............ 463/41 |
| 5,794,207 | A | * | 8/1998 | Walker et al. ............ 705/1 |
| 6,009,411 | A | * | 12/1999 | Kepecs ............ 705/14 |
| 6,014,634 | A | | 1/2000 | Scroggie et al. ............ 705/14 |
| 6,039,244 | A | | 3/2000 | Finsterwald ............ 235/375 |
| 6,185,541 | B1 | | 2/2001 | Scroggie et al. ............ 705/14 |
| 6,330,544 | B1 | * | 12/2001 | Walker et al. ............ 705/14 |
| 6,405,174 | B1 | * | 6/2002 | Walker et al. ............ 705/14 |

(Continued)

FOREIGN PATENT DOCUMENTS

| | | | | |
|---|---|---|---|---|
| JP | 2001-273431 A | | 1/2001 | ............ G06F 17/60 |
| WO | WO01/04773 A2 | | 1/2001 | ............ G06F 17/00 |
| WO | WO01/43044 A1 | | 6/2001 | ............ G06F 17/60 |
| WO | WO01/46848 A2 | | 6/2001 | ............ G06F 17/00 |

OTHER PUBLICATIONS

U.S. Appl. No. 60/149,156.*

(Continued)

*Primary Examiner* — Yehdega Retta
(74) *Attorney, Agent, or Firm* — Leason Ellis LLP

(57) ABSTRACT

A system and method for converting a rebate sponsor's offer into an instant credit or price reduction against a follow-on purchase. Rebate requests are obtained at a site on the Internet. The rebate request is tested to confirm that the at least one predetermined criterion has been satisfied. The person making the rebate request is enabled to make the follow-on purchase, with the rebate being converted into the instant credit or price reduction against the total price of the follow-on purchase. The follow-on purchase transaction is completed by charging that person for the purchase. The credit or price reduction can be conditioned on at least one predetermined criterion such as amount being spent on the follow-on purchase, the vendor from which the follow-on purchase is being made, and other criteria. The credit or price reduction can be redeemed in parts across a series of follow-on purchase transactions. In another aspect of the invention, consumers are advised of rebate offers. In this aspect, a server of a credit issuer receives purchase transaction details concerning an item purchase from a vendor, the item purchase is correlated with any rebate offer, and, in the event of a match, the consumer is advised by electronic mail that a rebate is available and can be converted into instant credit or price reduction on a follow-on purchase.

20 Claims, 6 Drawing Sheets